(12) United States Patent
Vesenjak

(10) Patent No.: US 7,175,014 B2
(45) Date of Patent: Feb. 13, 2007

(54) CLUTCH RELEASE DEVICE

(75) Inventor: Andelko Vesenjak, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 18 days.

(21) Appl. No.: 11/042,594

(22) Filed: Jan. 25, 2005

(65) Prior Publication Data

US 2005/0167233 A1 Aug. 4, 2005

(30) Foreign Application Priority Data

Jan. 29, 2004 (DE) ............... 10 2004 004 338

(51) Int. Cl.
*F16D 23/14* (2006.01)

(52) U.S. Cl. .................... 192/98; 192/110 B

(58) Field of Classification Search ............... 192/98
See application file for complete search history.

(56) References Cited

U.S. PATENT DOCUMENTS

| | | | |
|---|---|---|---|
| 4,142,618 A * | 3/1979 | Fontaine et al. ............ 192/98 |
| 4,579,211 A * | 4/1986 | Renaud ..................... 192/98 |
| 4,642,985 A * | 2/1987 | Nozawa et al. ............. 60/435 |
| 4,808,015 A * | 2/1989 | Babcock .................. 384/609 |
| 5,979,632 A | 11/1999 | Grosspietsch et al. |
| 6,588,558 B2 | 7/2003 | Otto et al. |

FOREIGN PATENT DOCUMENTS

| | | |
|---|---|---|
| DE | 30 08 403 A1 | 9/1981 |
| DE | 694 07 681 T2 | 7/1998 |
| DE | 197 44 821 A1 | 4/1999 |
| DE | 100 57 609 A1 | 5/2002 |
| FR | 2660034 A1 * | 9/1991 |
| GB | 2 070 717 A | 9/1981 |
| JP | 60159422 A | 8/1985 |
| WO | WO-98/06957 | 2/1998 |

* cited by examiner

Primary Examiner—Richard M. Lorrence
(74) Attorney, Agent, or Firm—Davis & Bujold, P.L.L.C.

(57) ABSTRACT

A clutch release device for a motor vehicle with a release flange (11) which is affixed to a housing and an axially slidably release bearing (9) guided on the release flange (11) between which, a bushing (10) is interposed.

13 Claims, 3 Drawing Sheets

CLUTCH RELEASE DEVICE

This application claims priority from German Application Serial No. 10 2004 004 338.8 filed Jan. 29, 2004.

FIELD OF THE INVENTION

The invention concerns a clutch release device.

BACKGROUND OF THE INVENTION

An essential component of today's shifting transmissions is the clutch release mechanism, with the aid of which, a clutch with start-up and shifting capabilities in a motor vehicle, can be automatically or manually activated. Such a clutch release device has been made known by DE 694 07 681 T2, wherein a release bearing, affixed to a release flange which, in turn, is fastened to a housing, can be guided in an axial, sliding motion. In addition to this, between said release flange and release bearing, a bearing is interposed, which can allow an effortless, axial sliding action with very little friction.

In the case of this known clutch release device, there are to be found on the radially, inward facing side of said bushing, axially directed, load bearing sections are installed which, by means of axially parallel grooves, are separated from one another. Further information regarding these said grooves, in particular, concerning their width, depth, number and arrangement on the inner circumference of the bushing, is not to be found in this present document in any exact accuracy.

Moreover, it is universally known, that bushings, as a rule, are made of plastics and can be impressed into or integrally joined within a release device housing.

A release lever acts upon a release bearing of such a clutch release device with a releasing force $F_A$, in such a manner, that the pivotal movement of said release lever is converted into a linear motion of the release bearing on the release flange.

Because of frictional intervention and an eccentric point of application for the force between the release lever and the release bearing which, from a practical standpoint, cannot be avoided on both the release lever and the release bearing a tilting moment $M_V$ of a greater or lesser force is generated. The magnitude of the force changes in dependency of the sliding position of the release bearing on the release flange.

A tilting force $F_V$ acts to create this tilting moment $M_V$, which force acts through the release bearing. That is to say, the bearing bushing thereof acts upon the release flange and there brings about an increase of friction in a longitudinal direction of the release bearing so that motion of the release bearing on the release flange is obstructed and thereby the activation of the clutch is hindered.

Even if, simultaneously, this additional frictional force on the respective clutch behavior may be small, relatively speaking. Nevertheless, during the operational life of such a known clutch release device, this leads to an additional abrasion of the release bearing. That is to say, frictional wear on the bushing as well as on the release flange. As a matter of fact, investigations directed to this very problem, on generically related clutch release devices have shown that the bushing of the release bearing "digs in" to the release flange, because of the above described effects. This leads to a self-obstruction of the release flange which, in turn, extends itself to the bushing thereof which is itself located on the release flange. Where shifting transmissions are concerned, these disturbances in the activation movements of a clutch release device bring about activation and comfort problems in the course of startup, maneuvering and shifting procedures.

With this background, the purpose of the invention is to develop a generic clutch release device so that, in spite of an eccentric point of application of force between the release lever and the release bearing, no abrasive wear related to a moment of tilt exists between the release bearing, i.e., the bushing, and the release flange.

SUMMARY OF THE INVENTION

The invention presupposes that an eccentric introduction of force through the release lever into the release bearing leads to a wear-producing force $F_V$ of tilting. The direction of this force is perpendicular to the surface of the release flange and is pointed toward the longitudinal axis X thereof. In the recognition of this connection, the proposal is to interpose longitudinal grooves in the radially, inward facing surface of the bushing and/or the radially outward facing surface of the release flange, which grooves are so positioned, that these run in the zone of the action line of the tilting force $F_V$, which acts upon the release bearing. This line of action is comprised of the sum of all tilting force impact points during an axial movement of the release bearing. In addition, where the grooves in the zone of this line of action are concerned, even those are to be counted, which are not directly under the stated application points of incoming force, but rather, are related thereto by placement within an advantageously selected, radially separated distance.

Examinations which have been carried out on clutch release devices, which are in accordance with the invention, surprisingly show that, by means of this targeted alignment of the longitudinal grooves, the abrasive wear problems mentioned in the introductory passages of this description can be set aside. This effect is to be attributed to the fact that, by means of the described design at the location of the tilting force $F_V$, no bushing material comes in contact with material of the release flange, and so, wear of the described kind is avoided. The application of the tilting force $F_V$ upon the respective areas neighboring a groove of the bushing cause, contrarily, no functionally disadvantaging wear.

In accordance with this, the invention bases itself on a clutch release device for a motor vehicle with a release flange affixed to a housing and with an axially, slidably displaceable release bearing guided on the release flange between which a bushing is placed.

In order to achieve a condition in which no abrasive wear, due to tilting force, occurs between the release lever and the release bearing, in spite of an eccentric point of application of force, provision is also made in that axially extending grooves are made in the radially inward facing surface of the bushing and/or in the radially outward facing surfaces of the release flange. These said grooves are so positioned that they run in the zone of the line of action of a tilting force $F_V$ being exerted upon the release bearing and/or the release flange.

In the concept of the invention, it is an equivalent measure, if the bushing material and the therein impressed grooves are placed directly on the surface of either the release flange or on the release bearing.

In an advantageous embodiment of the present invention, provision has been made, that at least two grooves are caused to be on the bushing and/or on the release flange. Further attention has been given to the fact that when the at least two grooves are longitudinally placed on the circumference of the bushing and/or on the release flange and are set to be diametrically opposed to one another.

It is of special importance for the functionality of the invented clutch release device that the ratio of the width of the groove width B to the groove depth T, as well as the number of the grooves, is chosen in such a way that even upon maximum application of the tilting force $F_V$ in the zone of the grooves, no mechanical contact between the release bearing, i.e., the bushing, and the release flange occurs.

Further in this matter, variants are also protected by the invention, the variants being such as wherein the ratio of the groove width B to the groove depth T as well as the number of the grooves, is so selected that by the application of the tilting force $F_V$ onto the release bearing, this said bearing, together with the longitudinal axis thereof, aligns itself to slightly incline toward the longitudinal axis X of the release flange.

In accordance with another development of the present invention, the bushing possesses a radially, inwardly facing carrying section and/or the release flange has a radially, outward facing carrying section, either or both of which said sections serve for reinforcement of the release bearing on the release flange. These carrying sections can be laminated by separate and, likewise, axially aligned interpiece spacing.

In consideration of the bushing, provision can also be made that this be impressed into the release bearing or impressed on the release flange. In addition, the release bearing can also be a component of a central release apparatus.

Another variant which is within the concept of the invention and likewise functional, provides that the bushing is not furnished as a separate component, but rather as a coating on the interior surface of the release bearing or is designed to be so coated on the outside of the release flange.

Finally the invention encompasses such variants which, instead of separate grooves, employ the interpiece spacings between the carrying sections, as described above, for preventing abrasive wear from tilting, thus allowing said separate grooves to be omitted.

BRIEF DESCRIPTION OF THE DRAWINGS

The invention will now be described, by way of example, with reference to the accompanying drawings in which.

DETAILED DESCRIPTION OF THE INVENTION

Figure 1:
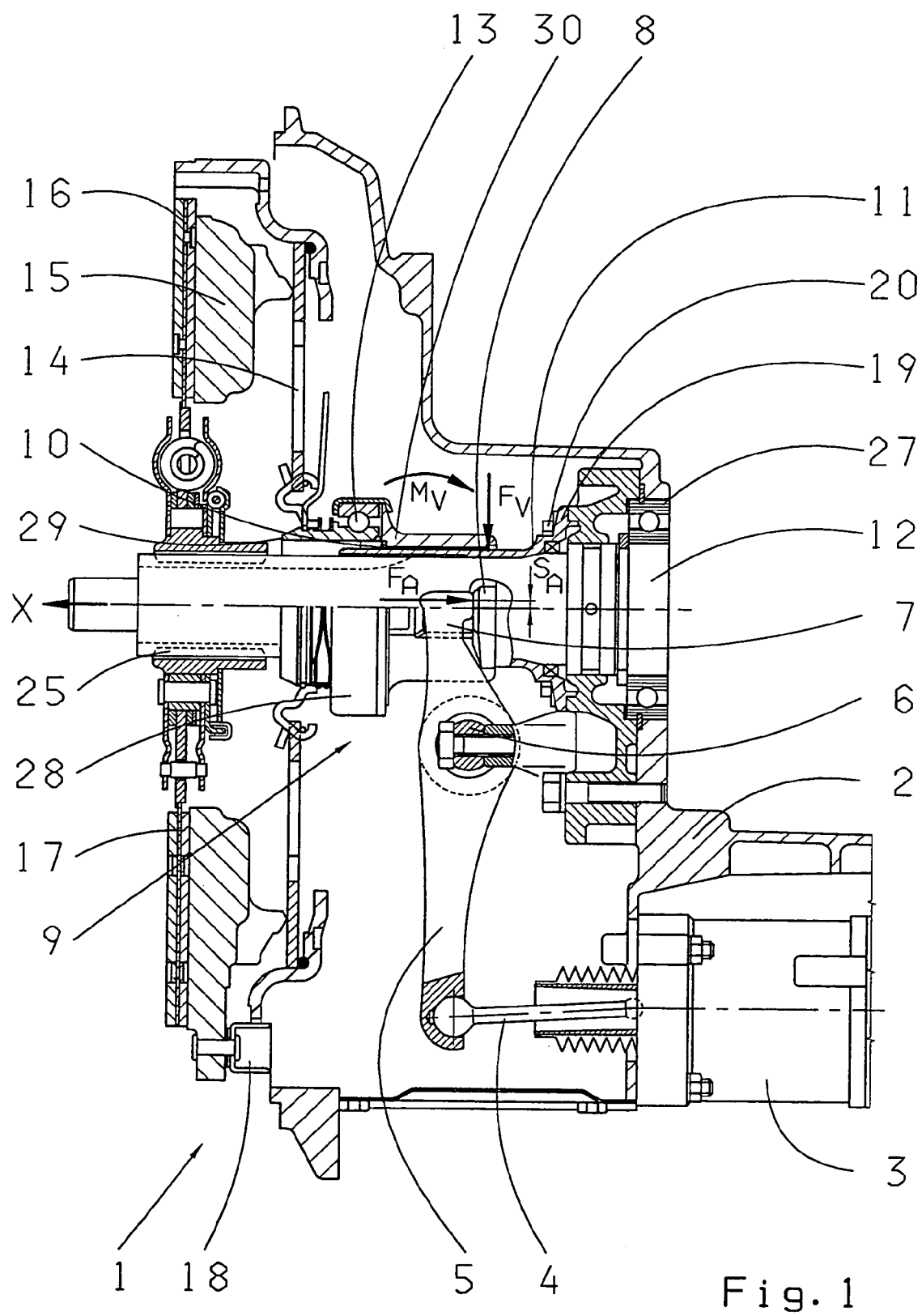
FIG. 1 is a sectional presentation of a part of a shifting transmission in the neighborhood of the clutch activation assembly.

Accordingly, from FIG. 1 is to be seen a clutch activation device 1, which is installed within a transmission housing 2, which housing is only partially shown here and that is a cross-sectional manner. To said clutch activation device 1 belongs a pressure cylinder 3, a piston rod 4 of which presses on the end of a release fork 5. The release fork 5 is pivotally supported in a swing bearing 6. The other end of the release fork 5 acts with its engagement hooks 7 on radially extending activation arms 8 on a release bearing 9, which is mounted to be axially slidable on a release flange 11. Moreover, the release flange 11, by means of set screws 20, is fastened to the transmission housing 2.

The release bearing 9 is essentially cylindrical in shape and encompasses a fastening section 29 for a plate spring 14, a roll bearing section 28 and a release shell 30. In this assembly, the fastening section 29 and the inner ring of a radial bearing 13 are designed as a common component, while the outer ring of the radial bearing 13 and the release shell 30, are force-fit bound with one another by means of a fastening component.

As FIG. 1 additionally shows, the radial out end of the plate spring 14 is secured on a clutch basket 18, onto which pressure plates 15 are already fastened. The plate spring 14 acts for the closure of the clutch in a known manner against the pressure plate 15, which presses against a frictional gasket 17 of a clutch disk 16. Also, the clutch basket 18 is in a driving connection with the vehicle motor (not shown). Beyond this, it can be recognized that the clutch disk 16, by means of a toothed insert connection 25, is bound to an input shaft 12 of the transmission, penetrating the housing 2 thereof through a radial bearing 27.

From FIG. 1, may also be inferred that between the release shell 30 of the release bearing 9, a bushing 10 is placed which, in this embodiment, is impressed into the release bearing 9.

Reacting to an activation of the pressure cylinder 3, the release fork 5 pivots around the bearing 6 so that the activation hooks 7 thereon, moving in a circular path, act against activation arm 8 of the release bearing 9. By means of the motion of the activation hooks 7, these do not engage coaxially to a longitudinal axis X of the release flange 11 or the axis of the release bearing 9, whereby a tilting moment $M_V$ acts upon the release bearing 9. On one hand, the amount of this tilting moment $M_V$ depends on an activation force $F_A$ of the release fork 5 on the release bearing 9 and, on the other hand, is dependent on a separating distance $S_A$ between the application point of the hooks 7 on the activation arms 8 and the longitudinal axis X of the release flange 11, i.e., on the release bearing 9. Therein the tilting moment $M_V$ varies, finally dependent on the slidingly displaced position of the release bearing 9.

By means of the tilting moment $M_V$, a tilting force $F_V$ acts on the release flange 11, by way of the release bearing 9 and the bushing 10 which, in accord with design, as described in the following, advantageously exerts no wear-constituting action on the release flange 11 or on the bushing 10.

Figure 2:
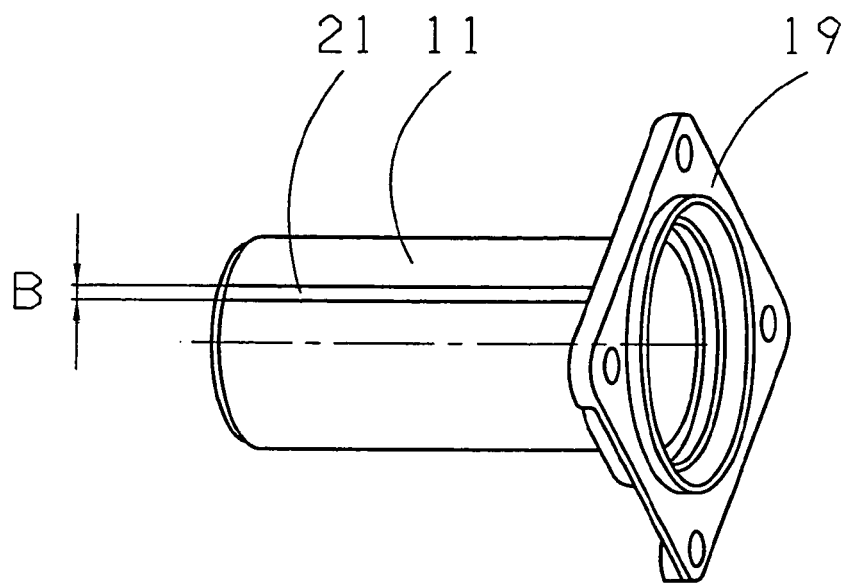
FIG. 2 is a release flange of the clutch activation assembly, following FIG. 1.
Figure 3:
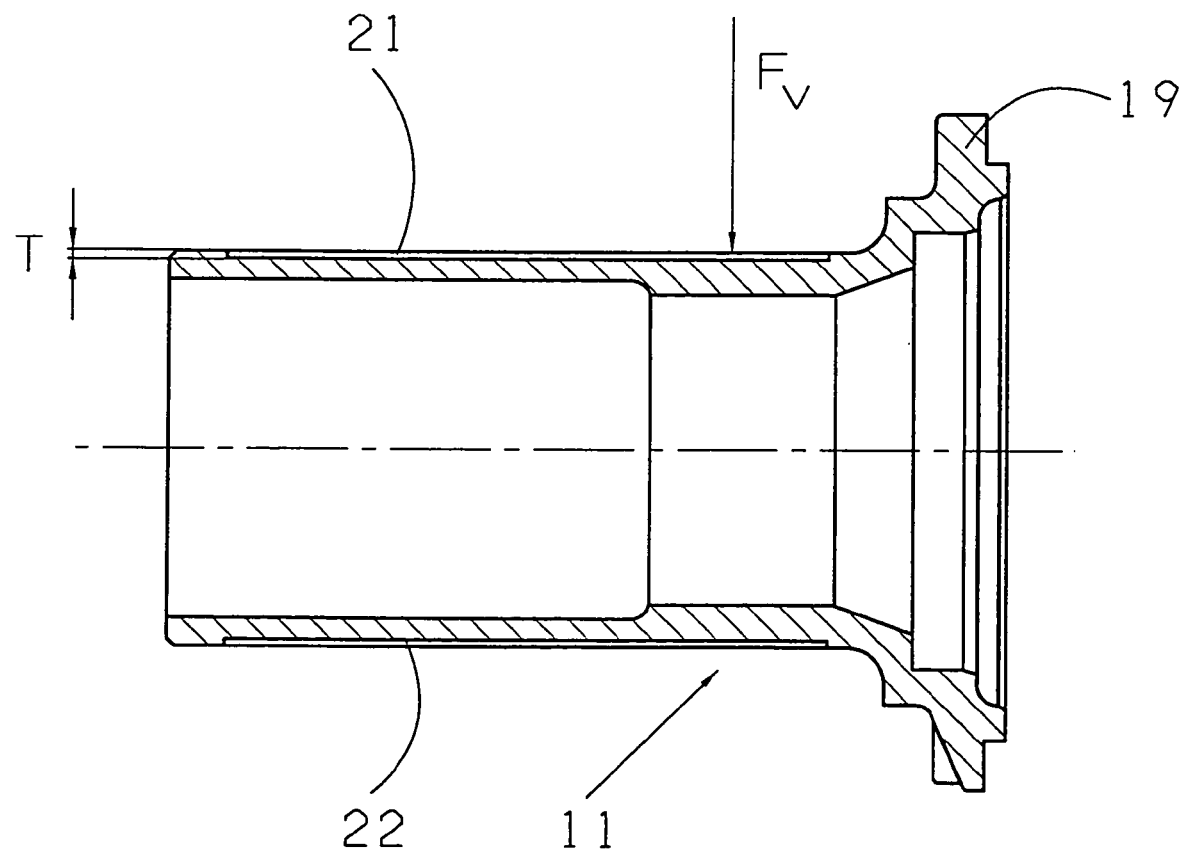
FIG. 3 is a release flange in accord with FIG. 2 in a cross-sectional drawing.

As shown in FIGS. 2 and 3, the release flange 11 is equipped, according to the invention, with two or more first grooves 21, 22, which run in the longitudinal direction X on the radial outer surface of the release flange 11. Preferably, in this arrangement, there are two second grooves 21, 22 exactly diametrically oppositely situated from the first. Of particular importance in the arrangement of these grooves 21, 22, is that these are so positioned on the release flange 11, that they run in the zone of the line of action of the tilting force $F_V$ which acts upon the release bearing 9, i.e., on the release flange 11. Expressed in a different manner, this means that the grooves 21,22 are placed radially, exactly underneath the tilting force $F_V$, which is to be defined as a perpendicularly impacting force.

A width B and a depth T of the grooves 21, 22 for this design are so selected that in the area of the grooves 21, 22, even under conditions of maximum application of the force $F_V$, no contact between the release bearing 9, i.e., its bushing 10 and the release flange 11 can occur. In this way, the option is open, that by the action of the tilting force $F_V$ onto the release bearing 9, said release bearing 9, along with its longitudinal axis, can be aligned to run slightly inclined toward the longitudinal axis X of the release flange 11.

Figure 4:
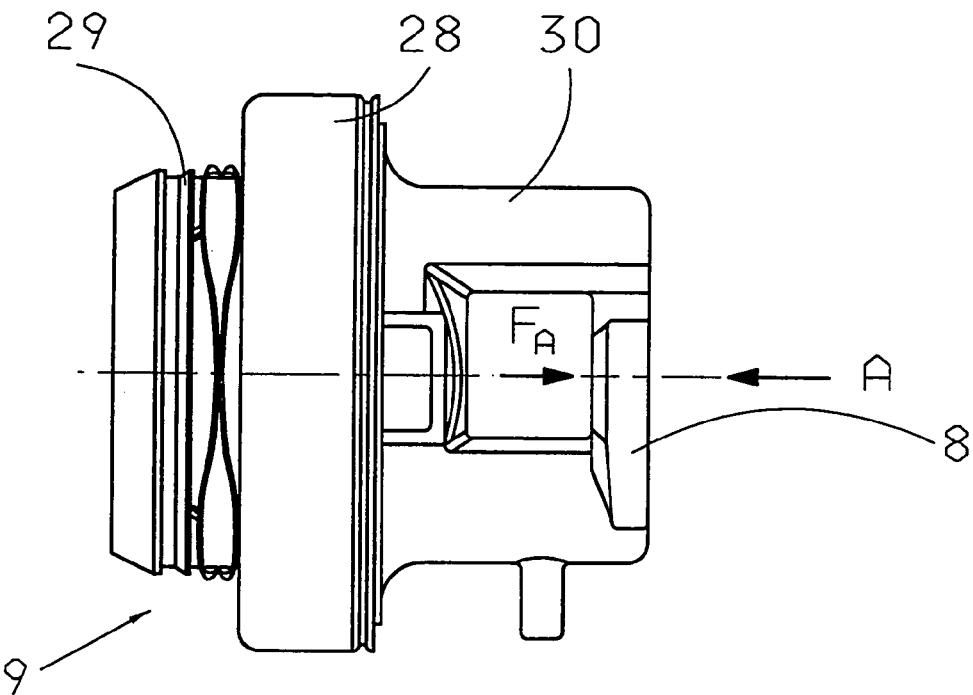
FIG. 4 is a side view of the release bearing in accord if FIG. 1.
Figure 5:
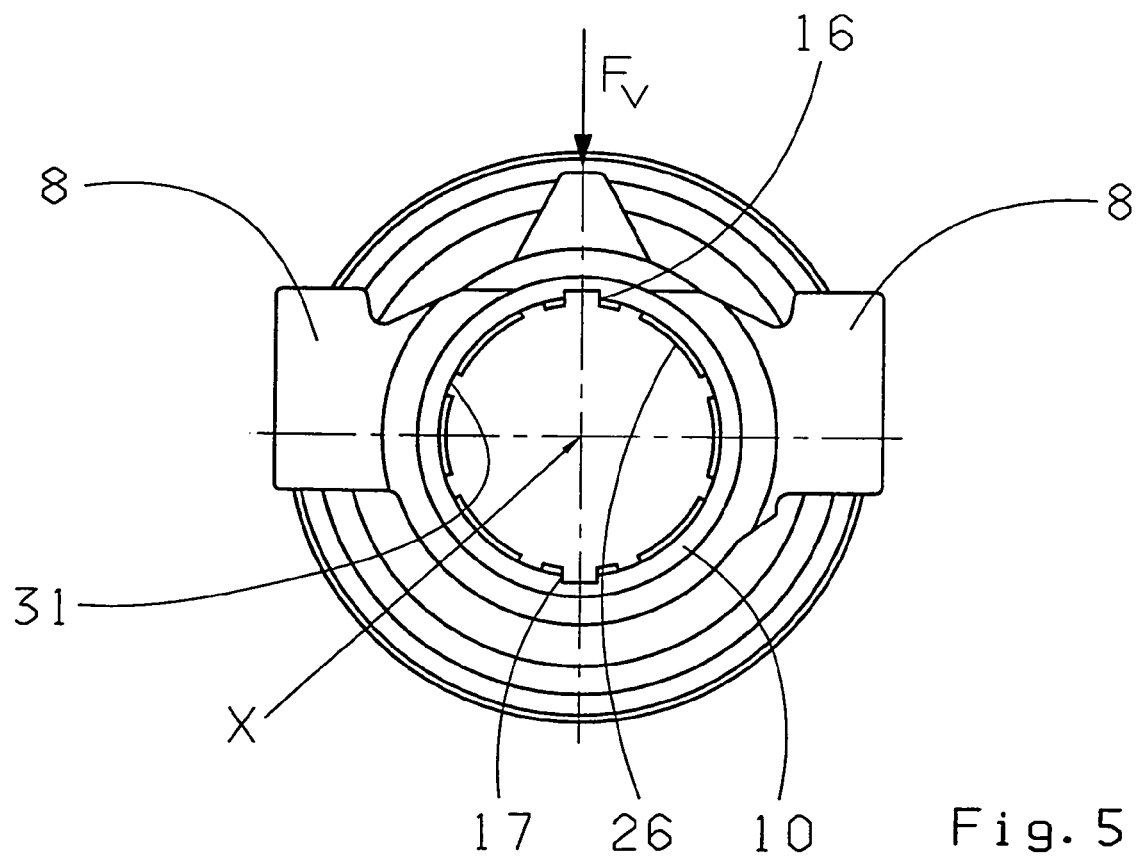
FIG. 5 is a view A of the release bearing in accord with FIG. 4.

In FIGS. 4 and 5, grooves 16 and 17, in a coacting or supporting manner, are designed to function in the radially inward facing surface of the bushing 10. Even here, the grooves 16, 17, are so placed, that these lie exactly underneath the tilting force $F_V$, which has been designed as a perpendicularly acting force.

In another embodiment of the invention, provision can be made that separated grooves in the bushing 10 and/or in the release flange 11 can be eliminated and, on this account, an intervening space 31 between carrying sections 26 running radially outward from the center, are so designed and constructed that these run in the zone of the line of action of the tilting force $F_V$ acting on the release bearing 9.

Reference Numerals

| | |
|---|---|
| 1 | clutch activation device |
| 2 | transmission housing |
| 3 | pressure cylinder |
| 4 | piston rod |
| 5 | release fork |
| 6 | bearing |
| 7 | hook |
| 8 | activation arm of release bearing |
| 9 | release bearing |
| 10 | bushing |
| 11 | release flange |
| 12 | input shaft to transmission |
| 13 | radial bearing of 9 |
| 14 | plate spring |
| 15 | pressure plate |
| 16 | clutch disk |
| 17 | frictional gasket |
| 18 | clutch basket |
| 19 | flange plate |
| 20 | set screw |
| 21 | groove in release flange |
| 22 | groove in release flange |
| 25 | plug in toothing |
| 26 | carrying section on bushing |
| 27 | radial bearing of 12 |
| 28 | roll bearing section of 9 |
| 29 | fastening section for 14 |
| 30 | release shell |
| 31 | interposed space between sec. 26 |
| B | width of groove |
| X | longitudinal axis |
| $F_V$ | tilting force |
| $F_A$ | release force |
| $M_V$ | tilting moment |
| $S_A$ | stretch of eccentricity |
| T | depth of groove |

The invention claimed is:

1. A clutch release device for a motor vehicle, the clutch release device comprising; a release flange (11) affixed to a housing (2) and an axially slidable release bearing (9) guided on said release flange (11), between which a bushing (10) is placed, in one or more of a surface of the bushing (10) which faces radially inward and in the surface of the release flange (11), which faces radially outward, grooves (21, 22) are placed, which said grooves (21, 22) are so located, that the grooves (21, 22) are radially aligned with a line of action of a tilting force $F_V$ acting on the release bearing (9) and the release flange (11).

2. The clutch release device according to claim 1, wherein at least two grooves (21, 22) are placed on the bushing (10) and on the release flange (11).

3. The clutch release device according to claim 2, wherein at least two grooves (21, 22) are so placed on one of a circumference of the bushing (10) and of the release flange (11) that the grooves (21, 22) lie diametrically opposite to one another.

4. The clutch release device according to claim 1, wherein a ratio of a groove width (B) to a groove depth (T) as well as a number of the grooves (21, 22) are so selected, that even in a case of maximum application of the tilting force ($F_V$) in a zone of the grooves (21, 22) no contact between the release bearing (9) or the bushing (10) and the release flange (11) can occur.

5. The clutch release device according to claim 1, wherein a ratio of a groove width (B) to a depth (T) thereof, as well as a number of the grooves (21, 22) are so selected, that upon application of the tilting force ($F_V$) the release bearing (9), with a longitudinal axis, has a slightly inclined alignment toward a longitudinal axis (X) of the release flange (11).

6. The clutch release device according to claim 1, wherein the bushing (10) is impressed into one of the release bearing (9) or the release flange (11).

7. The clutch release device according to claim 1, wherein the bushing (10) comprises a coating on one of an inner Surface of the release bearing (9) and an outside of the release flange (11).

8. The clutch release device according to claim 1, wherein the bushing (10) and the release flange (11) possess, respectively, carrier sections (26) which are directed radially inward and outward.

9. The clutch release device according to claim 1 wherein the separate grooves (21, 22) are defined as specifically designed and placed intervening spaces (31) between carrier sections (26) of the bushing (10).

10. The clutch release device according to claim 1, wherein the release bearing (9) is a component of a central release device.

11. A clutch release device for a motor vehicle, the clutch release device comprising;
   a release flange (11) defined about a longitudinal axis, the release flange affixed to a housing (2) and supporting an axially slidable release bearing (9);
   a bushing (10) positioned between the release flange (11) and the axially slidable release bearing (9);
   a first groove and a second groove formed in one of an outer surface of the release flange and an inner surface of the axially slidable release bearing (9);
   a release lever generating a radial force $F_V$ on the release bearing (9) in a direction perpendicular to said longitudinal axis; and
   wherein said first and second groove are radially aligned with the radial force on the release bearing (9) generated by the release lever.

12. The clutch release device for a motor vehicle as set forth in claim 11 wherein said first groove and said second groove are diametrically opposed about one of the outer surface of the release flange and the inner surface of the axially slidable release bearing (9).

13. The clutch release device for motor vehicle as set forth in claim 11 wherein a groove width (B) and a groove depth (T) are so selected, that even in a case of maximum application of the force $F_V$ aligned with the first and second grooves (21, 22) substantially no contact between the release bearing (9) or the bushing (10) and the release flange (11) occurs.

* * * * *